Figure 1:
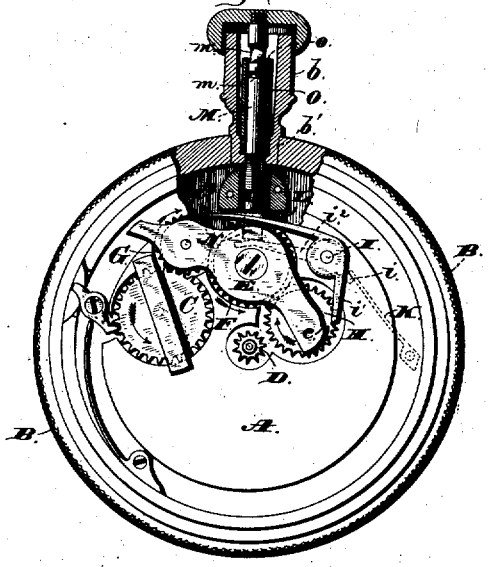

D. H. CHURCH.

Assignor, by mesne assignments, to R. E. ROBBINS and T. M. AVERY, trustees.

STEM WINDING WATCH.

No. 10,631. Reissued Aug. 4, 1885.

Witnesses:
Jas. E. Hutchinson
Henry C. Hazard

Inventor:
D. H. Church, by
Prindle & Russell, his Attys.

THE NORRIS PETERS CO., PHOTO-LITHO., WASHINGTON, D. C.

UNITED STATES PATENT OFFICE.

DUANE H. CHURCH, OF WALTHAM, MASSACHUSETTS, ASSIGNOR, BY MESNE ASSIGNMENTS, TO ROYAL E. ROBBINS, OF BOSTON, MASSACHUSETTS, AND THOMAS M. AVERY, OF CHICAGO, ILLINOIS, TRUSTEES.

STEM-WINDING WATCH.

SPECIFICATION forming part of Reissued Letters Patent No. 10,631, dated August 4, 1885.

Original No. 280,719, dated July 3, 1883. Application for reissue filed March 14, 1885.

*To all whom it may concern:*

Be it known that I, DUANE H. CHURCH, of Waltham, in the county of Middlesex, State of Massachusetts, (formerly of Chicago, Cook county, Illinois,) did invent certain new and useful Improvements in Stem-Winding Watches, for which Letters Patent of the United States No. 280,719, were issued upon the 3d day of July, 1883, which Letters Patent have been found to be inoperative and invalid, and not to cover the invention set forth in the specification and shown in the drawings which were filed in the Patent Office upon the 16th day of September, 1882, preparatory to the obtaining of the said Letters Patent. Now, therefore, being desirous of reissuing the said Letters Patent, I have prepared, and do hereby declare the following to be, a full, clear, and exact description of the said improvements, reference being had to the accompanying drawings, in which—

Figure 2:
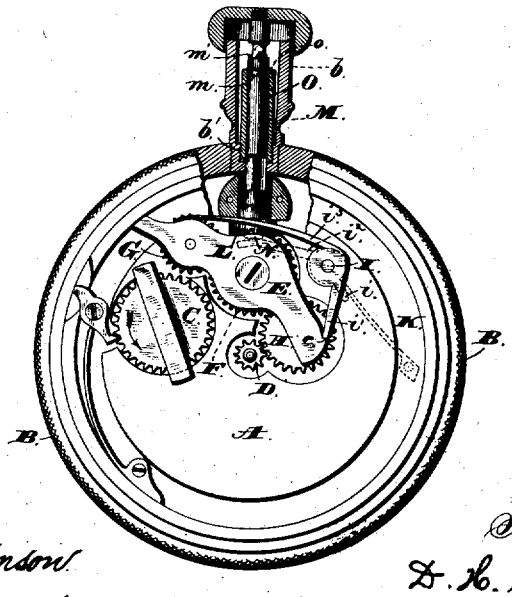

Figure 1 is a plan view of a watch containing my improvements, the dial being removed and the pendant and a portion of the center band being in section; and Fig. 2 is a like view of the same, showing the winding and setting train in position for setting the hands.

Letters of like name and kind refer to like parts in each of the figures.

This invention relates to watches in which the winding and hands-setting train is operated entirely by means of a rotatable stem-arbor that is adapted to be moved longitudinally for the purpose of causing said train to engage with the winding-wheel or dial-wheels. Heretofore in watches of this class said winding and hands-setting train has been normally in engagement with the winding-wheel and disconnected from the dial-wheels, so that an outward movement of said stem-arbor has been necessary in order to change the engagement of said train and adapt it for setting the hands. Such construction has required that there should be a positive connection between the stem-arbor and the winding and hands-setting train to enable said arbor, when drawn outward, to effect the necessary change in the engagement of said train, which positive connection has made said stem-arbor virtually a part of the movement and has prevented or rendered very difficult and expensive the changing of said movement from one case to another.

The object of my invention is to render watch movements and cases readily interchangeable, to which end said invention consists, principally, as an improvement in stem winding and setting watches, in a winding and hands-setting train which is adapted to be placed in engagement with the winding-wheel or the dial-wheels by the longitudinal movement of a stem-arbor that has no positive connection with said train, substantially as and for the purpose hereinafter specified.

It consists, further, as an improvement in stem winding and setting watches, in a winding and hands-setting train which is adapted to be placed in engagement with the winding-wheel or the dial-wheels, and is normally in engagement with said dial-wheels, substantially as and for the purpose hereinafter shown.

It consists, further, as an improvement in stem winding and setting watches, in a winding and hands-setting train which is adapted to be placed in engagement with the winding-wheel or the dial-wheels by the longitudinal movement of a stem-arbor, and is normally in engagement with said dial-wheels, substantially as and for the purpose set forth.

It consists, further, as an improvement in stem winding and setting watches, in a winding and hands-setting train, which is normally in engagement with the dial-wheels, in combination with a rotatable stem-arbor that has no positive connection with said train and is adapted to be moved longitudinally within the case-stem to cause said winding and hands-setting train to engage with the winding-wheel and to be simultaneously disengaged from said dial-wheels, substantially as and for the purpose hereinafter shown and described.

It consists, further, as an improvement in stem winding and setting watches, in a winding and hands-setting train which is normally in engagement with the dial-wheels, in combination with a rotatable longitudinally-movable stem-arbor that has no positive connection with the watch-movement, and when moved longitudinally to the inner limit of its motion will cause said winding and setting train to be disengaged from said dial-wheels and engaged with the winding-wheel, and when moved longitudinally to the outer limit of its motion will permit said train to be disengaged from said winding-wheel and engaged with said dial-wheels, substantially as and for the purpose hereinafter specified.

It consists, further, as an improvement in stem winding and setting watches, in the combination of a winding and hands setting train which is normally in engagement with the dial-wheels, a stem-arbor having no positive connection with said train, and an intermediate device which is adapted to communicate the longitudinal inward movement of said stem-arbor to said winding-train and cause the same to engage with the winding-wheel, substantially as and for the purpose hereinafter shown and described.

It consists, further, as an improvement in stem winding and setting watches, in a watch-case provided with a longitudinally movable stem-arbor which is adapted to engage with a suitably-constructed watch-movement without having a positive connection therewith, and a device for holding said stem-arbor in different longitudinal positions, said device being independent of the watch-movement and outside of the movement-holding space in the case, substantially as and for the purpose hereinafter specified.

It consists, finally, as an improvement in stem winding and setting watches, in a watch-case provided within its pendant with a longitudinally-movable stem-arbor which is adapted to engage with a suitably-constructed movement without having positive connection therewith, and has within its periphery one or more grooves, or their equivalent, and a spring device secured within said pendant and adapted to engage with the grooves of said stem-arbor, substantially as and for the purpose hereinafter shown.

In the annexed drawings, A represents the top plate of a watch-movement, which plate is contained within the center band, B, of a watch-case that is provided with the usual pendant *b*.

As this invention relates solely to the winding and hands-setting mechanisms, only the main winding-wheel C and one of the dial-wheels, D, are shown of all of the time-train.

Pivoted upon the plate A is a yoke, E, which at its pivotal center carries a toothed wheel, F, and at each end has pivoted another wheel, G or H, that is in engagement with and driven by said wheel F. The shape of said yoke and the proportions of its wheels are such that by a slight oscillation of the former upon its pivot the wheel G may be caused to engage with the winding-wheel C, while by a movement of said yoke in an opposite direction said wheels C and G will be disengaged and said wheel H will be caused to engage with the dial-wheel D.

Journaled within the plate A is an arbor, I, which, below said plate, is provided with a radial lug, *i*, that is engaged by a spring, K, (shown by dotted lines,) while from the upper end of said arbor an arm, *i'*, extends outward and bears against the end of the yoke E, adjacent to the dial-wheel D, and, by the action of said spring, operates to hold said yoke in position to cause the wheel H to engage with said dial-wheel. A notch, *e*, within the edge of said yoke, engages with the end of said arm or dog *i'* and operates to lock said parts in position, as shown by Fig. 2.

Journaled within a suitable bearing, in a line with and adjacent to the pendant *b*, is a pinion, L, which meshes with the wheel F and is provided with an axial opening that is adapted to receive the squared end *m* of a stem-arbor, M, which arbor is journaled within said pendant *b*, and when rotated therein operates to set in motion the winding and hands-setting train. Said stem-arbor is also adapted to be moved longitudinally within certain limits, for reasons hereinafter given.

From the side of the arbor I, opposite to the lug *i*, beneath the plate A, an arm, $i^2$, extends radially outward, and when the winding and hands-setting train is in engagement with the dial-wheel D has its outer end against or is near the inner end of the pinion L, when said end is engaged by one end of a block, N, that is contained loosely within the axial opening of said pinion, and extends between said arm and the inner end of the stem arbor M. As thus arranged, an inward movement of the stem-arbor M will, by means of the intermediate sliding device, N, carry the outer end of the arm $i^2$ in the same direction, and, by a partial rotation of the shaft I, will throw the dog *i'* out of engagement with the yoke E, so as to permit the latter to be turned to bring its wheel G into engagement with the winding-wheel C. The releasing of the dog *i'* from engagement with the yoke E is caused to automatically change the winding and hands-setting train into engagement with the winding-wheel C by means of a spring-arm, $i^3$, that extends from the upper end of the arbor I to or near the end of said yoke which carries the wheel G, and when the arm $i^2$ is moved inward by the inward motion of the stem-arbor M, said spring-arm is carried in the same direction until its outer end impinges upon the adjacent end of said yoke and moves the same upon its axis, so as to separate the wheels H and D and bring into engagement the wheels G and C, as shown in Fig. 1. When the stem-arbor M is drawn outward, so as to release the arm $i^2$, the spring K, being free to act, returns the shaft I to its former position, so as to relieve the winding-wheel end of the yoke E from the pressure of the spring arm $i^3$, and at the same time causes the dog *i'* to bear upon the opposite end of said yoke with sufficient force to move said yoke to the opposite limit of its motion and cause its train to engage with the dial-wheels, the relative positions of parts being then as shown in Fig. 2.

While the mechanism between the stem-arbor and the winding and dial wheels is preferably employed, my invention is not limited to these particular devices, as any of the well known forms of intermediate mechanism may be used.

In order that the longitudinal movement of the stem-arbor M may be properly limited and said arbor held with sufficient firmness in each position without interference with its freedom of rotation, I employ a spring-retainer, O, which is preferably formed by partially splitting a tube lengthwise and securing its whole end within the inner end of the axial recess $b'$ of the pendant $b$ and turning inward the ends of its split portion or forming at such point an internal bead. Said stem-arbor is provided with two peripheral grooves, $m$ and $m'$, the first of which is engaged by the jaws $o$ of said retainer when said arbor is at the inner limit of its motion, while the second of said notches, $m'$, is engaged by said jaws when said arbor is at the outer limit of its motion. The inward spring of the jaws $o$ is sufficient to cause them to hold the stem-arbor M in either of its longitudinal positions with the necessary degree of firmness to prevent accidental displacement, but does not prevent said arbor from being easily moved from one to the other of such positions, when desired. When the stem-arbor is drawn to the outer limit of its motion, its inner end projects into the pinion L only so far as to enable it to rotate said pinion for the purpose of setting the hands, and in such position offers no obstruction to the removal from or insertion of a movement within the case, and is ready for use as soon as a movement is in place.

Heretofore in watches of this class the means for limiting the longitudinal movement of the stem-arbor have been placed in the movement. By this improvement the limiting devices are contained wholly in the case instead of the movement, whereby the case is always ready for the insertion of any movement designed for it, and such operation is as easily effected as in case of a key-winding watch.

In hunting-case watches, when a locking spring or catch is employed for fastening the front cover when closed, the groove $m$ of the stem-arbor M should be wide enough to permit said arbor to have sufficient additional inward motion to enable it to act as a push-pin in opening the case.

Instead of the peripheral grooves in said stem-arbor, a single peripheral enlargement or elevation may be formed thereon, and the ends of such enlargement form limiting-shoulders which would be the equivalents of said grooves.

In order that when the movement is removed from the case the winding-train may be held out of engagement with the dial-wheels, a suitable device should be employed for locking said parts in such position. For such purpose a screw having an eccentric or half head may be arranged, so that when turned partially around the larger portion of such screw-head will bear upon the arm $l^2$ and produce the same effect as would the longitudinally-inward movement of the stem-arbor.

In describing the stem-arbor as having no positive connection with the winding and hands-setting train, I wish to be understood as meaning such construction as causes said arbor to be contained within the pendant of a watch case and to form part of such case, in contradistinction to an organization in which the stem-arbor is journaled in the movement and is so connected therewith as to be removed from the case with said movement.

In my construction the winding-arbor forms part of the case, while in other organizations it forms part of the movement.

Having thus described my invention, what I claim is—

1. As an improvement in stem winding and setting watches, a winding and hands-setting train which is adapted to be placed in engagement with the winding-wheel or the dial-wheels by the longitudinal movement of a stem-arbor that has no positive connection with said train, substantially as and for the purpose specified.

2. As an improvement in stem winding and setting watches, a winding and hands-setting train which is adapted to be placed in engagement with the winding-wheel or the dial-wheels, and is normally in engagement with said dial-wheels, substantially as and for the purpose shown.

3. As an improvement in stem winding and setting watches, a winding and hands-setting train which is adapted to be placed in engagement with the winding-wheel or the dial-wheels by the longitudinal movement of a stem-arbor, and is normally in engagement with said dial-wheels, substantially as and for the purpose set forth.

4. As an improvement in stem winding and setting watches, a winding and hands-setting train which is normally in engagement with the dial-wheels, in combination with a rotatable stem-arbor that has no positive connection with said train, and is adapted to be moved longitudinally within the case stem to cause said winding and hands-setting train to engage with the winding-wheel and to be simultaneously disengaged from said dial-wheels, substantially as and for the purpose shown and described.

5. As an improvement in stem winding and setting watches, a winding and hands-setting train which is normally in engagement with the dial-wheels, in combination with a rotatable longitudinally-movable stem-arbor that has no positive connection with the watch-movement, and when moved longitudinally to the inner limit of its motion will cause said winding and setting train to be disengaged from said dial-wheels and engaged with the winding-wheel, and when moved longitudinally to the outer limit of its motion will permit said train to be disengaged from said winding-wheel and engaged with said dial-wheels, substantially as and for the purpose specified.

6. As an improvement in stem winding and setting watches, the combination of a winding and hands-setting train which is normally in engagement with the dial-wheels, a stem-arbor having no positive connection with said train, and an intermediate device which is adapted to communicate the longitudinal inward movement of said stem-arbor to said winding-train and cause the same to engage with the winding-wheel, substantially as and for the purpose shown and described.

In testimony whereof I hereunto set my hand this 21st day of February, 1885.

DUANE H. CHURCH.

Witnesses:
C. F. BROWN,
RICHARD J. POWERS.